United States Patent
Park et al.

(10) Patent No.: US 10,506,458 B2
(45) Date of Patent: Dec. 10, 2019

(54) OPERATION METHOD FOR TERMINAL OPERATING IN CONGESTED NETWORK SITUATION IN WIRELESS COMMUNICATION SYSTEM AND APPARATUS THEREFOR

(71) Applicant: LG ELECTRONICS INC., Seoul (KR)

(72) Inventors: Sangmin Park, Seoul (KR); Jaehyun Kim, Seoul (KR); Taehun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/777,090

(22) PCT Filed: Oct. 25, 2016

(86) PCT No.: PCT/KR2016/012010
§ 371 (c)(1),
(2) Date: May 17, 2018

(87) PCT Pub. No.: WO2017/086617
PCT Pub. Date: May 26, 2017

(65) Prior Publication Data
US 2018/0352449 A1 Dec. 6, 2018

Related U.S. Application Data

(60) Provisional application No. 62/257,691, filed on Nov. 19, 2015.

(51) Int. Cl.
*H04W 24/02* (2009.01)
*H04W 76/10* (2018.01)
(Continued)

(52) U.S. Cl.
CPC ....... *H04W 24/02* (2013.01); *H04W 28/0247* (2013.01); *H04W 76/10* (2018.02); *H04W 76/18* (2018.02); *H04W 24/04* (2013.01)

(58) Field of Classification Search
None
See application file for complete search history.

(56) References Cited

U.S. PATENT DOCUMENTS

| 2011/0199905 A1* | 8/2011 | Pinheiro | H04W 28/0215 370/235 |
| 2015/0181462 A1* | 6/2015 | Iwai | H04W 28/16 370/229 |
| 2017/0094707 A1* | 3/2017 | Lin | H04W 76/18 |

FOREIGN PATENT DOCUMENTS

| CN | 102448111 A | 5/2012 |
| EP | 2663122 A2 | 11/2013 |

(Continued)

OTHER PUBLICATIONS

3GPP TS 24.301, 3rd Generation Partnership Project; Technical Specification Group Core Networks and Terminals; Non-access-stratum (NAS) protocol for Evolved Packet System; XP050927892, Mar. 2015; pp. 1-384.

*Primary Examiner* — Diane L Lo
(74) *Attorney, Agent, or Firm* — Dentons US LLP

(57) ABSTRACT

A terminal and a method for operating the terminal are disclosed, the method comprising: transmitting a PDN connection request message without an APN; receiving a PDN connection rejection message including a backoff timer; and applying the backoff timer only to a specific APN.

6 Claims, 11 Drawing Sheets

(51) Int. Cl.
*H04W 28/02* (2009.01)
*H04W 76/18* (2018.01)
*H04W 24/04* (2009.01)

(56) References Cited

FOREIGN PATENT DOCUMENTS

| | | |
|---|---|---|
| KR | 10-2013-0127368 A | 11/2013 |
| KR | 10-2014-0115710 A | 10/2014 |
| KR | 10-2015-0006316 A | 1/2015 |
| KR | 10-2015-0060717 A | 6/2015 |
| WO | 2012-041184 A1 | 4/2012 |

* cited by examiner

OPERATION METHOD FOR TERMINAL OPERATING IN CONGESTED NETWORK SITUATION IN WIRELESS COMMUNICATION SYSTEM AND APPARATUS THEREFOR

This application is a National Stage Application of International Application No. PCT/KR2016/012010, filed on Oct. 25, 2016, which claims the benefit of U.S. Provisional Application No. 62/257,691, filed on Nov. 19, 2015, all of which are hereby incorporated by reference in their entirety for all purposes as if fully set forth herein.

TECHNICAL FIELD

The present invention relates to a wireless communication system, and more particularly, to a method for operating a user equipment in a network congestion state and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

DISCLOSURE OF THE INVENTION

Technical Tasks

An object of the present invention is to prevent malfunction of user equipments in a network congestion state.

Another object of the present invention is to solve a problem that user equipments perform unnecessary procedures caused by conventional network signaling.

A further object of the present invention is to prevent user equipments from having delays even when they can transmit signaling without any problems.

Technical tasks obtainable from the present invention are non-limited the above mentioned technical tasks. And, other unmentioned technical tasks can be clearly understood from the following description by those having ordinary skill in the technical field to which the present invention pertains.

Technical Solutions

To achieve these objects and other advantages, in an aspect of the present invention, provided herein is a method for operating a user equipment (UE), including: transmitting a packet data network (PDN) connectivity request message without an access point name (APN) to a network entity; receiving, from the network entity, a PDN connectivity reject message including a backoff timer; and applying the backoff timer only to a default APN of a previously established PDN connection.

The PDN connectivity reject message may further include information indicating that the default APN is in a congestion state.

The backoff timer may not be applied to other APNs except the default APN.

The operation method may further include transmitting a modify bearer request message or a PDN connectivity request message with respect to other APNs except the default APN.

In another aspect of the present invention, provided herein is a user equipment (UE), including: a transmitter; a receiver; and a processor connected to the transmitter and the receiver. In this case, the processor may be configured to: transmit a packet data network (PDN) connectivity request message without an access point name (APN) to a network entity; receive, from the network entity, a PDN connectivity reject message including a backoff timer; and apply the backoff timer only to a default APN of a previously established PDN connection.

In a further aspect of the present invention, provided herein is another method for operating a user equipment (UE), including: transmitting a packet data network (PDN) connectivity request message without an access point name (APN) to a network entity; receiving, from the network entity, a PDN connectivity reject message including a backoff timer and APN information; and applying the backoff timer to a specific APN indicated by the APN information.

The PDN connectivity reject message may further include information indicating that the specific APN is in a congestion state.

The backoff timer may not be applied to other APNs except the specific APN.

The operation method may further include transmitting a modify bearer request message or a PDN connectivity request message with respect to other APNs except the specific APN.

In a still further aspect of the present invention, provided herein is another user equipment (UE), including: a transmitter; a receiver; and a processor connected to the transmitter and the receiver. In this case, the processor may be configured to: transmit a packet data network (PDN) connectivity request message without an access point name (APN) to a network entity; receive, from the network entity, a PDN connectivity reject message including a backoff timer and APN information; and apply the backoff timer to a specific APN indicated by the APN information.

Advantageous Effects

According to embodiments of the present invention, it may be able to expect advantageous effects described in the following.

First, it is possible to prevent UE malfunction in a network congestion state, thereby improving the quality of services provided to users.

Second, it is possible to prevent UEs from performing unnecessary signaling, thereby preventing waste of radio resource and power.

Third, it is possible to prevent delays that may occur in UE operation, thereby achieving efficient communication.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

DESCRIPTION OF DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

BEST MODE FOR INVENTION

Figure 1:
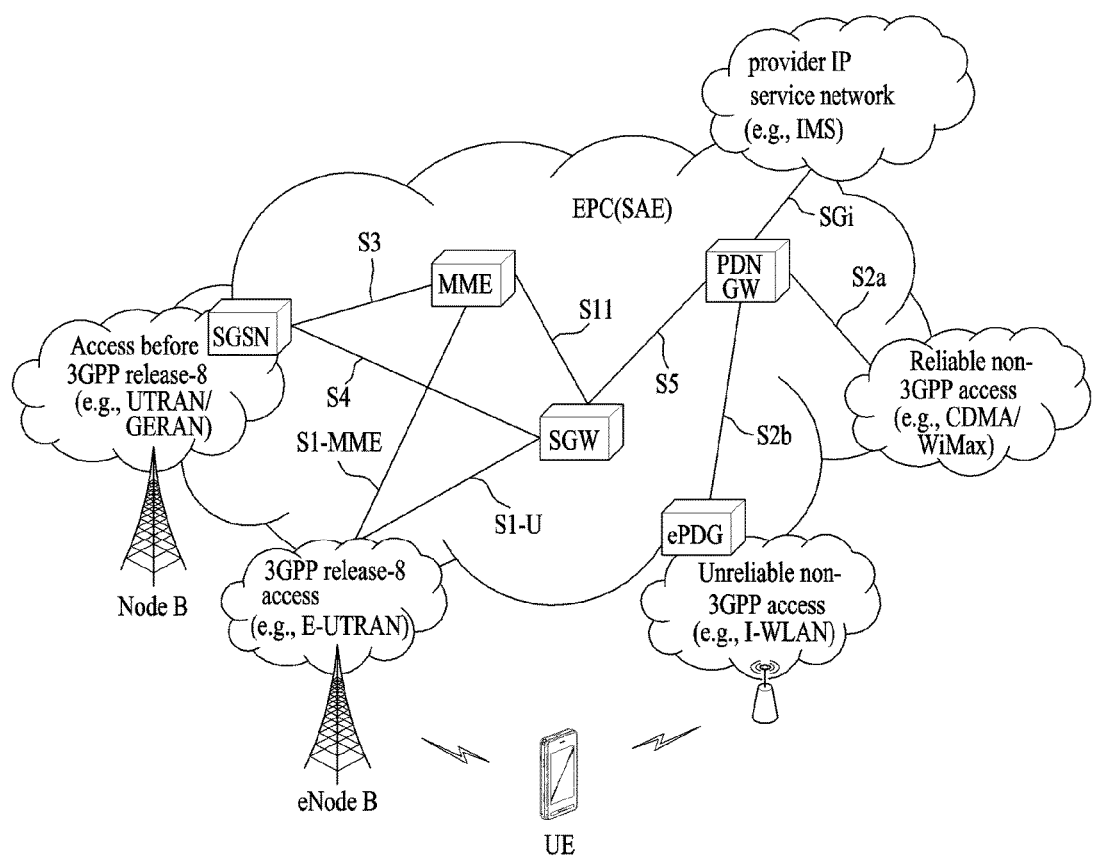
FIG. 1 is a diagram for a schematic structure of an EPS (evolved packet system) including an EPC (evolved packet core)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

Terms used in the following description are defined as follows.

UMTS (Universal Mobile Telecommunication System): 3rd generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE/UTRAN, which is evolved from UMTS.

NodeB: Base station of a GERAN/UTRAN, which is installed outdoors and has a coverage corresponding to a macro cell.

eNodeB: Base station of E-UTRAN, which is installed outdoors and has a coverage corresponding to a macro cell.

UE (User Equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device. In MTC, the term "UE" or "terminal" may refer to an MTC device.

HNB (Home NodeB): Base station of a UMTS network, which is installed outdoors and has a coverage corresponding to a macro cell.

HeNB: Base station of an EPS network, which is installed outdoors and has a coverage corresponding to a macro cell.

MME (Mobility Management Entity): Network node of an EPS network, which performs Mobility Management (MM) and Session Management (SM).

PDN-GW (Packet Data Network-Gateway)/P-GW: Network node of an EPS network, which performs UE IP address allocation, packet screening and filtering, charging data collection, etc.

SGW (Serving Gateway): Network node of an EPS network, which performs mobility anchoring, packet routing, idle mode packet buffering, a function of triggering an MME to page a UE, etc.

PCRF (Policy and Charging Rule Function): a network node of an EPS network performing policy decision to dynamically apply QoS and a charging policy differentiated according to a service flow OMA DM (Open Mobile Alliance Device Management): a protocol designed to manage a mobile device such as a cellular phone, a PDA, a mobile computer and the like. This protocol performs such a function as device configuration, firmware upgrade, error report and the like.

OAM (Operation Administration and Maintenance): a network management functional group for providing network flaw display, performance information, and data and diagnosis function.

NAS (Non-Access Stream): a higher stratum of a control plane between UE and MME. The NAS corresponds to a functional layer for transceiving signaling and traffic message between a UE and a core network in LTE/UMTS protocol stack. The NAS supports mobility of a UE, a session management procedure for establishing and managing IP connection between a UE and a PDN GW, and IP address management, etc.

AS (Access-Stratum): includes a protocol stack between a UE and a radio (or access) network and plays a role in transmitting data, network control signal, and the like.

NAS configuration MO (Management Object): MO (Management Object) used in a procedure for setting parameters related to NAS functionality to a UE.

PDN (Packet Data Network): Network at which a server supporting a specific service (e.g., MMS (Multimedia Messaging Service) server, WAP (Wireless Application Protocol) server, etc.) is located.

PDN connection: logical connection between a UE and a PDN, represented by a single IP address (single IPv4 address and/or single IPv6 prefix).

APN (Access Point Name): character string for indicating or identifying a PDN. In order to access a requested service or a network, it is necessary to undergo a specific P-GW. In this case, the APN corresponds to a name (character string) predefined in a network to discover the specific P-GW. (e.g., internet.mnc012.mcc345.gprs)

RAN (Radio Access Network): a unit including Node B, eNode B, and RNC (Radio Network Controller) for controlling the Node B and the eNode B in 3GPP network. The RAN exists between UEs and provides connection to a core network.

HLR (Home Location Register)/HSS (Home Subscriber Server): Database including subscriber information in 3GPP network. The HSS can perform such a function as configuration storage, identity management, user status storage and the like.

PLMN (Public Land Mobile Network): Network configured to provide a mobile communication service to individuals. The PLMN can be configured in a manner of being separated according to an operator.

ANDSF (Access Network Discovery and Selection Function): As a network entity, the ANDSF can provide a policy for enabling a UE to discover and select access capable of being used by the UE in a unit of a service provider.

1. EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
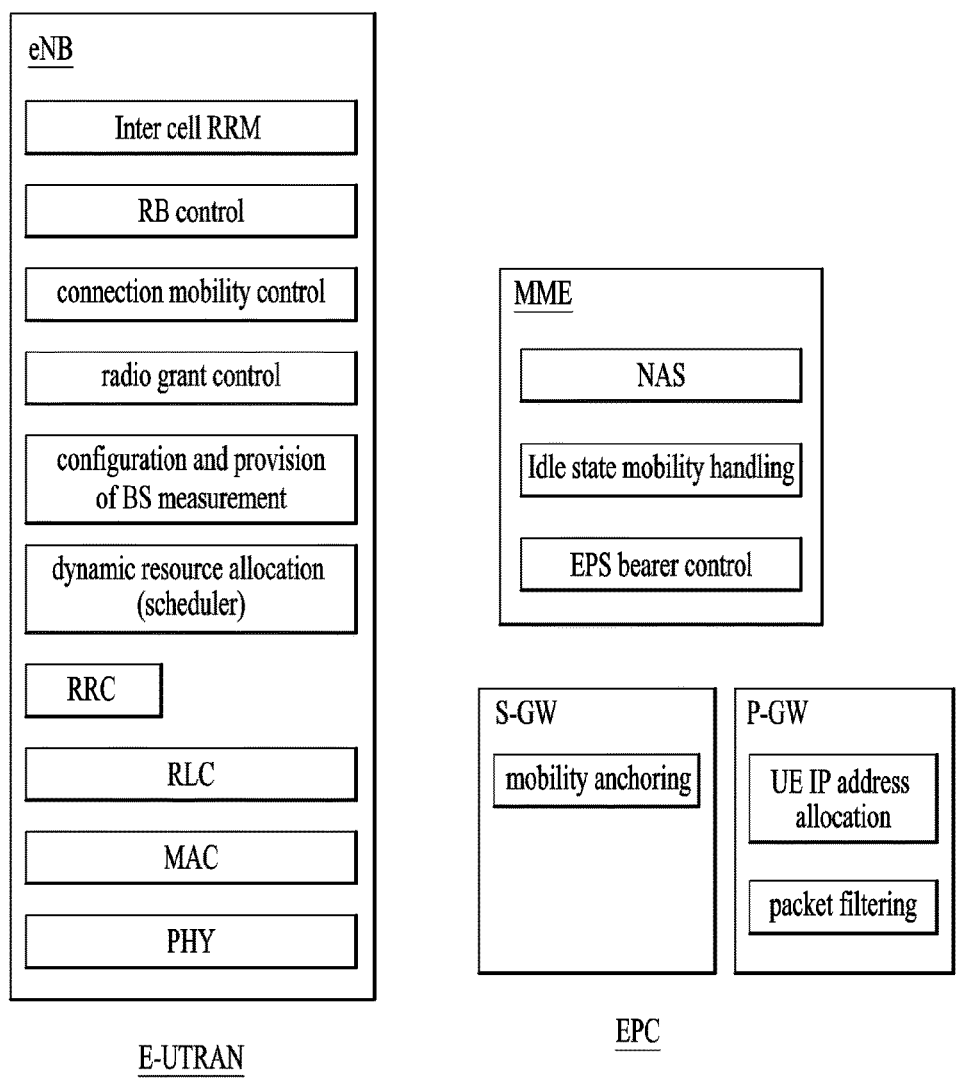
FIG. 2 is a diagram for an example of a general architecture of E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
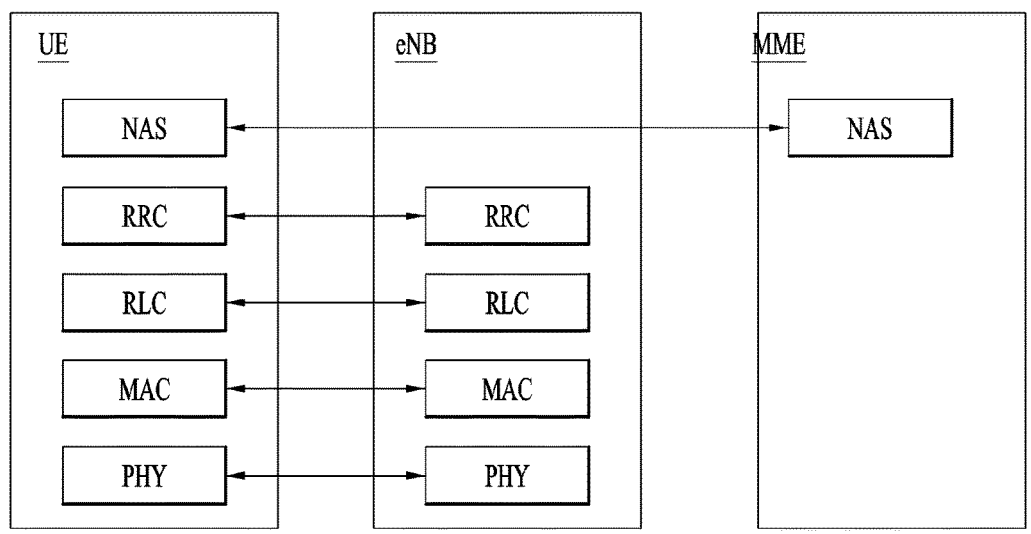
FIG. 3 is a diagram for an example of a wireless interface protocol in a control plane.
Figure 4:
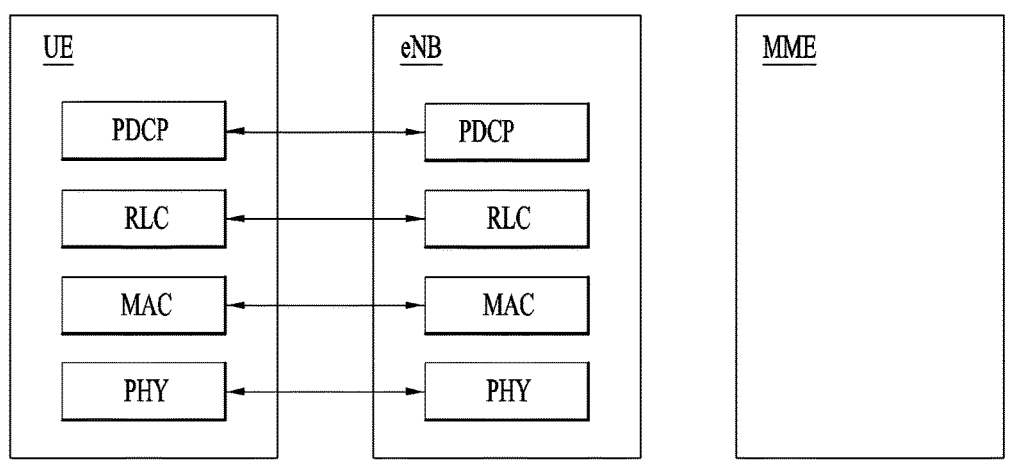
FIG. 4 is a diagram for an example of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
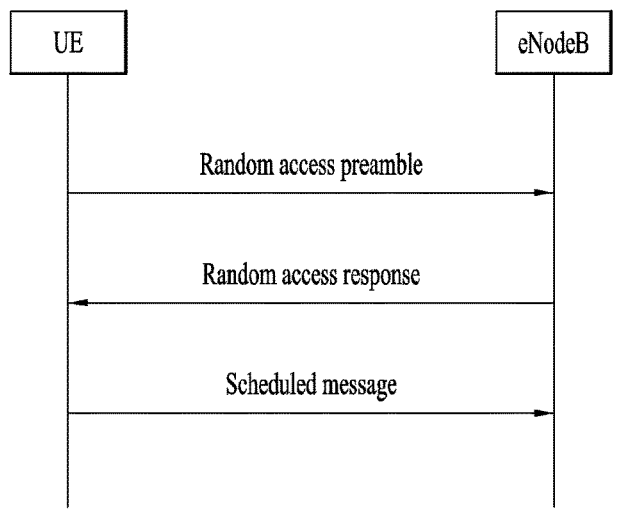
FIG. 5 is a flowchart for explaining a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
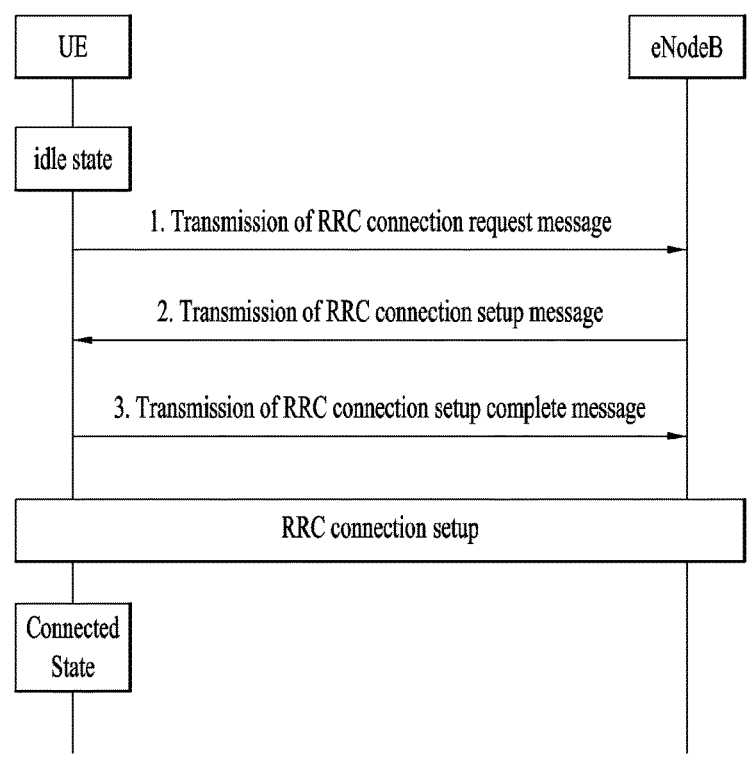
FIG. 6 is a flowchart for a connection procedure in an RRC (radio resource control) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. Proposed Method for UE Operation

To establish a new PDN connection to the network, a UE transmits a PDN connectivity request message to a network entity. Such a PDN connectivity request message may be included in an attach request message during an attach procedure and then transmitted. Alternatively, separated from the attach request message, the PDN connectivity request message may be transmitted as a standalone EPS session management (ESM) request message. The former case is called a piggyback method, and the latter case is called a stand-alone method. Details of the piggyback method can be found in TS 24.301. Hereinafter, the stand-alone method will be described in detail.

Figure 8:
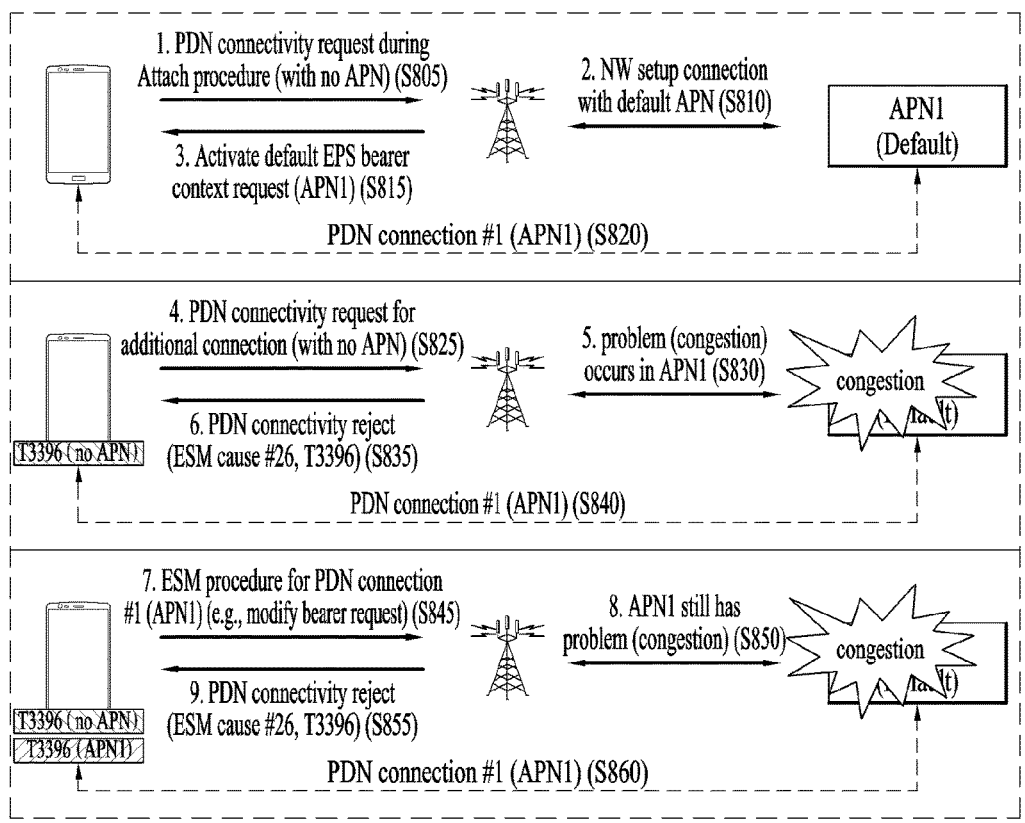
Figure 9:
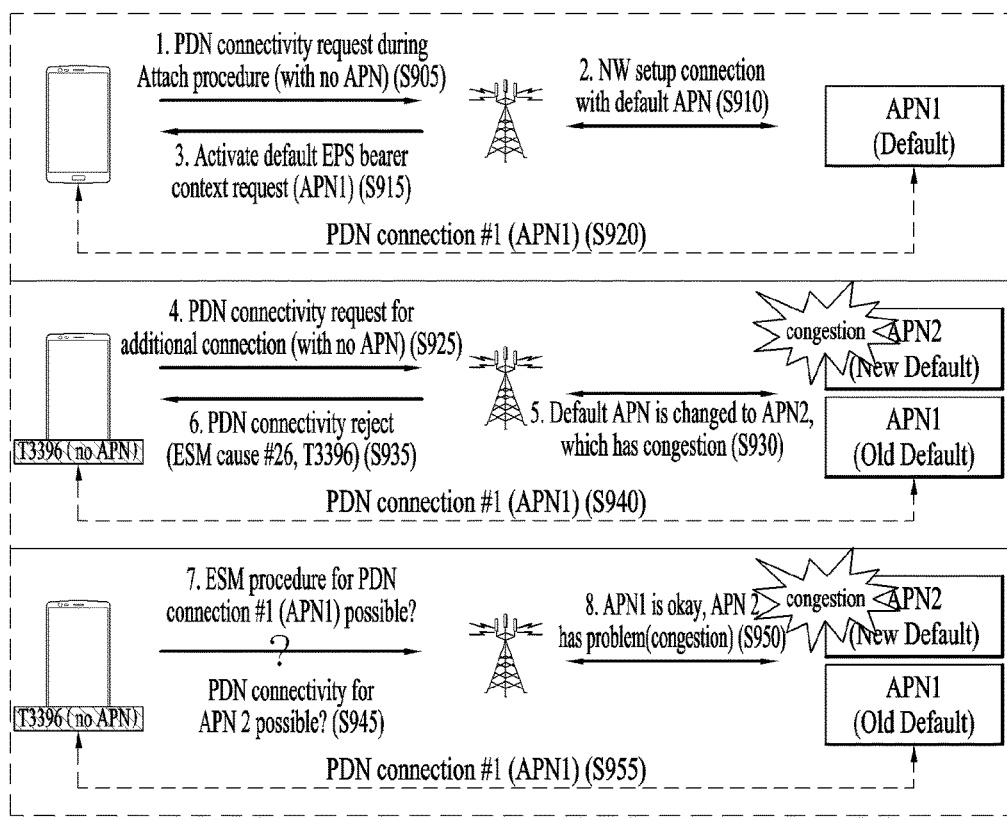

In the following, the problems of the prior art will be described with reference to FIGS. 7 to 9. Unless it is an emergency, a UE can transmit a PDN connectivity request message without including an APN. When receiving the PDN connectivity request message that does not include the specific APN, a network entity performs a process for allocating the UE to a default APN designated by a service provider. That is, when a UE requests a PDN connection without designating a specific APN, the UE is allocated to a default APN unless it is not in an emergency situation.

In this case, if the UE successfully completes the PDN connection procedure, information on the APN of the generated PDN connection is transmitted to the UE in an activate default EPS bearer context request message. That is, the UE can obtain the information on the APN (i.e., default APN) of the currently established PDN connection from the message. Details of the message can be found in TS 24.301.

On the other hand, if the PDN connection procedure fails, it may cause a problem. When receiving a PDN connectivity request message without an APN, if the network is unable to process the UE's request for several reasons, the network transmits a PDN connectivity reject message to the UE. In this case, the network transmit, to the UE, a backoff timer value according to a reject cause together with the reject message. For example, when the network transmits the PDN connectivity reject message to the UE due to ESM cause #26 "Insufficient Resources", the network transmits the backoff timer value to the UE. The UE starts timer T3396 using the received backoff timer value. In addition, while the timer is running, the UE cannot transmit a new ESM message to the network. Although timer T3396 operates by being associated with a specific APN in general, if a PDN connectivity request message includes no APN (that is, in the case of a PDN connectivity request message without an APN), the timer can operate without association with the specific APN. In other words, while timer T3396 without association with the specific APN is running, the UE cannot transmit a PDN connectivity request message without a new APN to the network until backoff timer T3396 expires or stops.

If the PDN connection procedure fails although the UE transmits the PDN connectivity request message without the APN designation to the network, the UE cannot receive the information on the default APN. In other words, while the backoff timer is running, the UE does not transmit any ESM message without an APN to the network. However, since the UE cannot obtain the information on the default APN, several problems may occur as illustrated in FIGS. 7 to 9.

Figure 7:
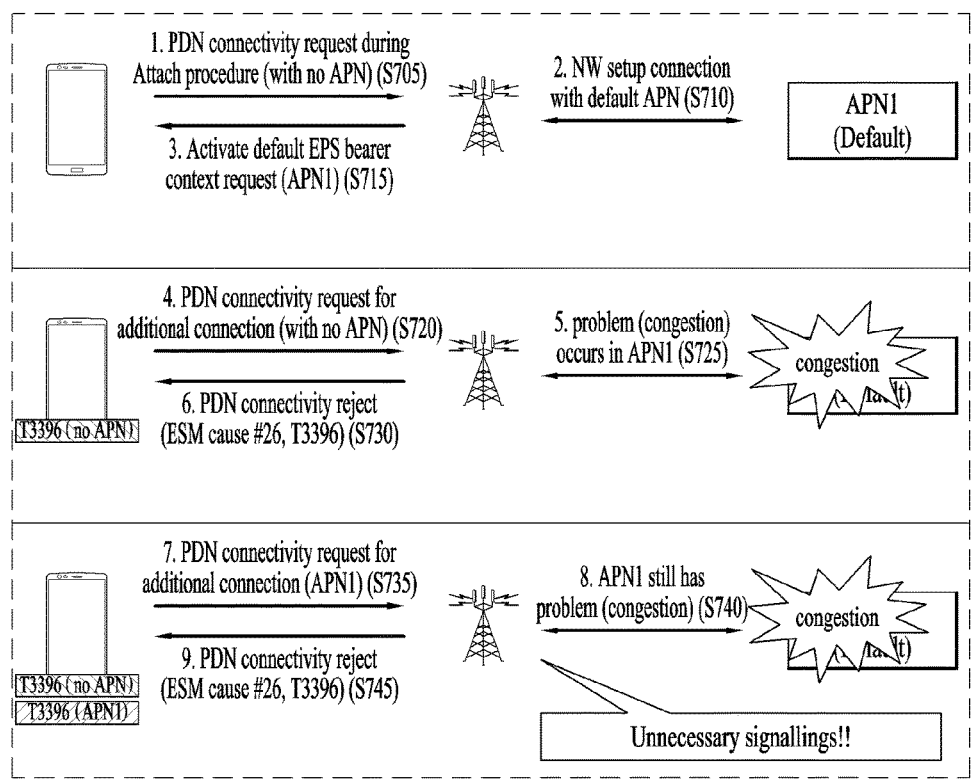
FIGS. 7 to 9 are diagrams illustrating problems of the prior art related to the present invention.

First, referring to FIG. 7, a UE transmits a PDN connectivity request message with no APN to the network during an attach procedure [S705]. If APN 1 corresponding to a default APN for the UE is configured, the network transmits information on APN 1 to the UE by including the information in an activate default EPS bearer context request message [S710 and S715]. Thereafter, the UE transmits a PDN connectivity request message with no APN again because the UE requires an addition PDN connection to the default APN [S720], but in this case, the network may be in a congestion state [S725]. Thus, the network transmits a PDN connectivity reject message, and such a message includes ESM cause #26 as information indicating the congestion state together with backoff timer T3396 [S730].

However, since backoff timer T3396 corresponds to a timer operating without association with a specific APN and the UE has transmitted the PDN connectivity request message with no APN, the UE cannot determine which APN is associated with the received reject message. In this case, if the UE transmits a PDN connectivity request message for APN 1 after expiration of the backoff timer, APN 1 transmits to the UE a PDN connectivity reject message again because it is still in the congestion state [S735, S740 and S745]. That is, since the reject message received by the UE in step S730 and the information indicating that the timer is for APN 1 are not transmitted, the UE requests the PDN connection to APN 1 again. Thereafter, an unnecessary procedure where the UE receives a reject message and then operates a backoff timer again may be performed.

Now, a description will be given with reference to FIG. 8. Since steps S805 to S840 of FIG. 8 are similar to steps S705 to S730 of FIG. 7, details thereof are omitted. FIG. 8 additionally shows that a PDN connection between a UE and APN 1 is established [S820 and S840]. Since although the UE receives a PDN connectivity reject message and backoff timer T3396 from the network in step S835 and then operate the timer, the UE cannot recognize which APN is in responsible for the rejection, the UE operates backoff timer T3396 without association with a specific APN.

Meanwhile, the UE may transmit a different ESM message for the PDN connection to APN 1, which is generated in steps S805 to S820 [S845]. For example, even while backoff timer T3396 without association with a specific APN is running, the UE may perform an ESM procedure including transmission of a modify bearer request message for the PDN connection to APN 1 besides the PDN connection request where APN 1 is specified. In this case, if APN 1 is still in the congestion state, the network transmits a PDN connection reject message to the UE so that the UE unnecessarily operates a backoff timer [S850 and S855] like the case shown in FIG. 7. In other words, since in the case of FIG. 8, the reject message transmitted to the UE does not explicitly indicate which APN is responsible for the rejection like FIG. 7, overhead occurs, that is, the UE operates the backoff timer for APN 1 again and transmits an unnecessary signaling message to APN 1 in the congestion state.

Next, a description will be given with reference to FIG. 9. Since steps S905 to S920 of FIG. 9 are similar to those of FIG. 8, details thereof are omitted. In the situation that a PDN connection to APN 1 corresponding to the default APN is established, a UE may transmit a PDN connectivity request message with no APN to the network in order to create an additional PDN connection [S925]. In this case, the default APN for the UE is changed from APN 1 to APN 2, and APN 1 corresponding to the old default APN is not in the congestion state but APN 2 corresponding to the new default APN is in the congestion state [S930]. Since the UE transmits the PDN connectivity request message with no APN in the situation that the default APN for the UE is changed to APN 2 in the congestion state, the network transmits a PDN connectivity reject message including information on cause #26 representing the congestion state and a backoff timer [S935].

In this case, not only may whether the UE can perform an ESM procedure including transmission of a modify bearer request message on PDN connection #1 to APN 1 corresponding to the old default APN become problematic, but whether the UE can send a request for the additional PDN connection to APN 2 corresponding to the new default APN in the congestion state may be problematic [S945 and S950]. That is, the UE is allowed to perform the ESM procedure because APN 1 corresponding to the old default APN is not in the congestion state. However, if the PDN connection request made by the UE is performed, it causes a problem that an unnecessary procedure may be performed like FIG. 7 because APN 2 corresponding to the new default PAN is in the congestion state.

Hereinafter, embodiments for solving the above-described problems will be explained with reference to FIGS. 10 to 12.

Figure 10:
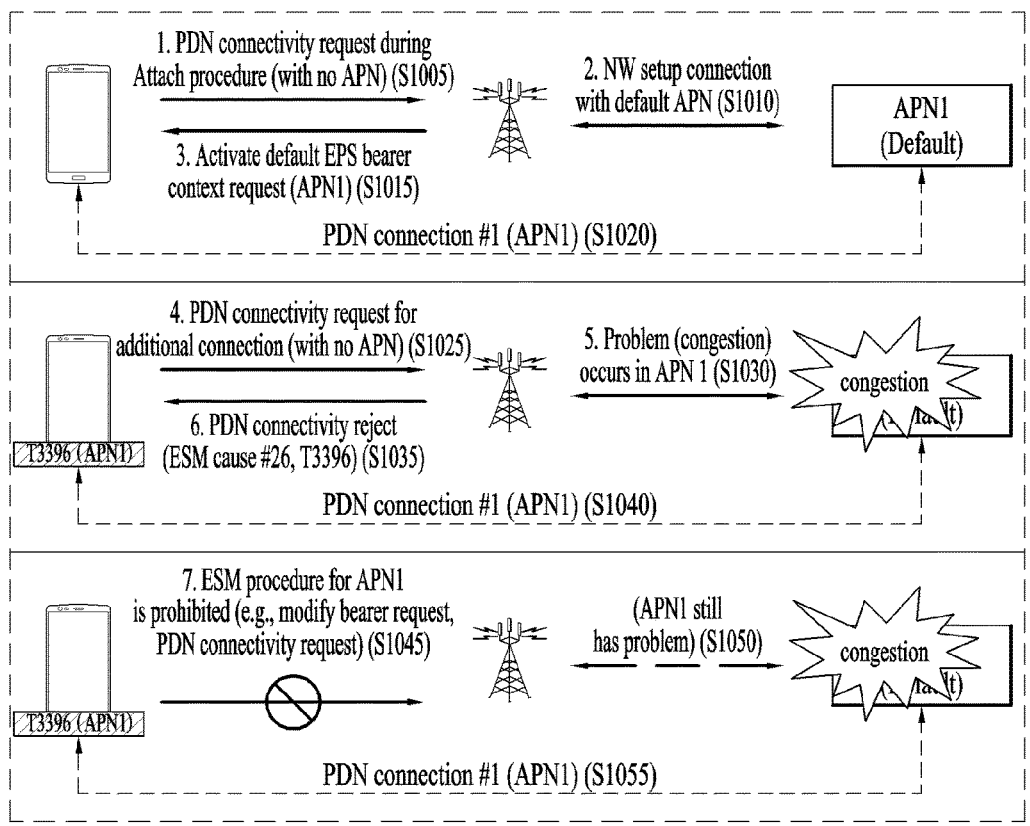
FIGS. 10 to 12 are diagrams illustrating proposed embodiments.

First, referring to FIG. 10, after a PDN connection to APN 1 corresponding to the default APN is established, a UE recognizes that APN 1 is the default APN [S1005, S1010, S1015, and S1020]. Meanwhile, although the UE transmits a PDN connection request message with no APN to the network, a PDN connectivity reject message including a backoff timer is transmitted to the UE because APN 1 corresponding to the default APN is in the congestion state [S1025, S1030 and S1035].

According to a proposed embodiment, when the PDN connectivity request message with no APN is rejected, the UE operates the received timer by associating it with the default APN. Here, the backoff timer operation based on association with the default APN means that the backoff timer, which operated without association with any APNs, operates based on association with a specific APN (i.e., default APN for a UE).

By operating the received backoff timer by limiting to APN 1 corresponding to the default APN, the UE may not transmit ESM signaling (e.g., modify bearer request message or PDN connectivity request message) to APN 1 in the congestion state while the backoff timer is running [S1045 and S1050]. In other words, according to the embodiment proposed in FIG. 10, when the PDN connectivity request with no APN is rejected, the UE operates the backoff timer included in the reject message by limiting to the predetermined default APN. Of course, since the backoff timer is applied only to the default APN, the UE can perform an ESM procedure with respect to other APNs except the default APN.

Figure 11:
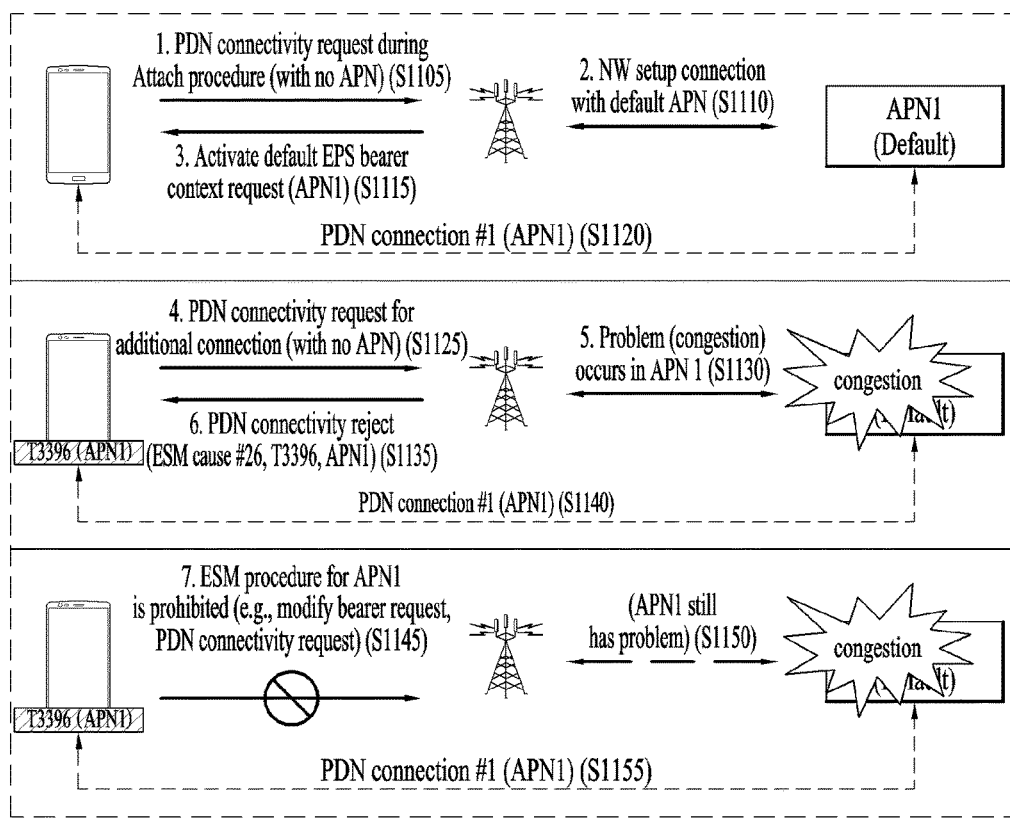

Since steps S1105 to S1130 of FIG. 11 are similar to those of FIG. 10, details thereof are omitted. If APN 1 corresponding to the default APN is in the congestion state, the network transmits a PDN connectivity reject message to a UE by including information on APN 1 in the PDN connectivity reject message in response to a PDN connectivity request message transmitted with no APN from the UE [S1135]. The embodiment of FIG. 11 is difference from that of FIG. 10 in that the PDN connectivity reject message transmitted by the network explicitly includes information on a specific APN. In other words, according to the proposed embodiment, the network explicitly informs the UE that the PDN connectivity request is rejected because APN 1 is in the congestion state.

Thus, based on reject cause #26, the UE recognizes that APN 1 is in the congestion state and does not perform ESM signaling to APN 1 while the backoff timer is running [S1145 and S1150]. That is, since the specific APN, which is received together with the backoff timer, is currently in the congestion state, the UE applies the backoff timer only to the corresponding APN. It is a matter of course that the UE can perform an ESM procedure with respect to other APNs except APN 1 corresponding to the specified APN like FIG. 10.

Meanwhile, the PDN connectivity reject message described with reference to FIG. 11 can be implemented as shown in Table 2 below. According to Table 2, since the PDN connectivity reject message includes information on APNs, the UE can be explicitly informed which APN is in the congestion state.

TABLE 2

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | PDN connectivity reject message identity | Message type 9.8 | M | V | 1 |
| | ESM cause | ESM cause 9.9.4.4 | M | V | 1 |
| 27 | Protocol configuration options | Protocol configuration options 9.9.4.11 | O | TLV | 3-253 |
| 37 | Back-off timer value | GPRS timer 3 9.9.3.16B | O | TLV | 3 |
| 28 | Access point name | Access point name 9.9.4.1 | O | TLV | 3-102 |
| 6B | Re-attempt indicator | Re-attempt indicator 9.9.4.13A | O | TLV | 3 |

Figure 12:
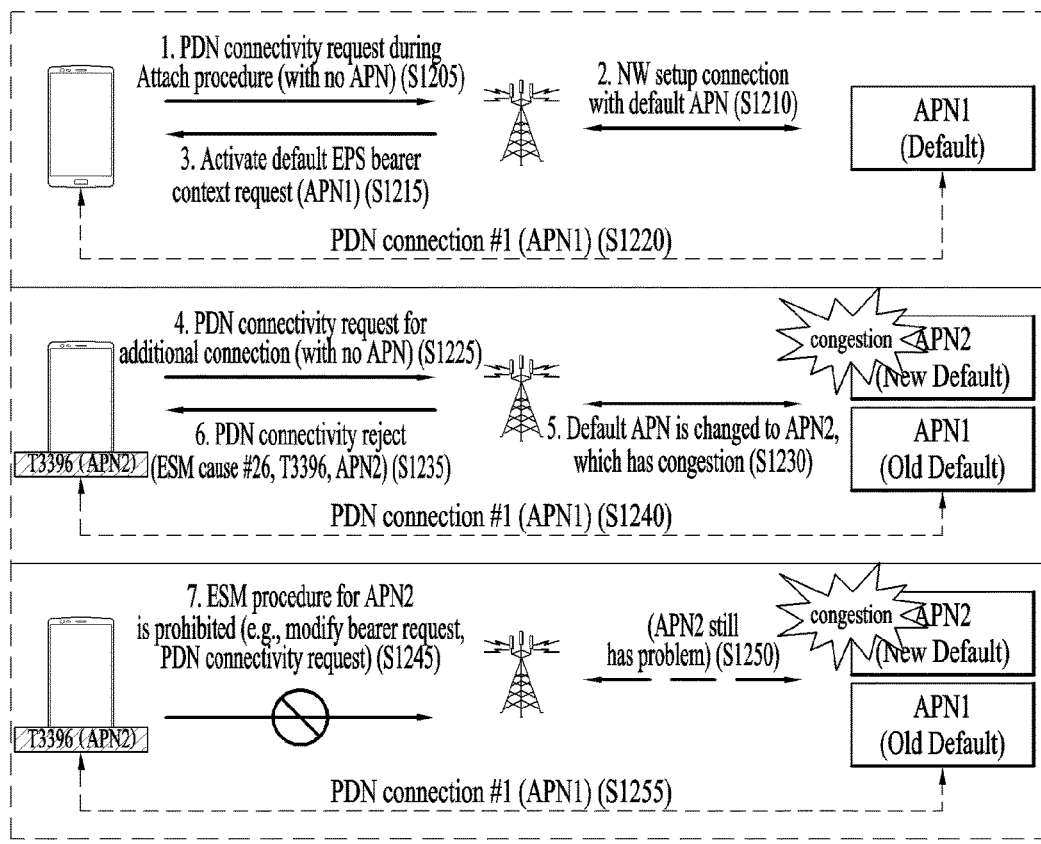

Since steps S1205 to S1220 of FIG. 12 are similar to those of FIG. 11, details thereof are omitted. Referring to FIG. 12, a UE transmits a PDN connectivity request message with no APN to the network, and in this case, the default APN for the UE is changed from APN 1 to APN 2 [S1225 and S1230]. In addition, APN 1 corresponding to the old default APN is not in the congestion state, but APN 2 corresponding to the new default APN is in the congestion state. Since APN 2 corresponding to the default APN for the UE is in the congestion state, the network transmits a PDN connectivity reject message, and in this case, information on APN 2 in the congestion state is included in the PDN connectivity reject message [S1235].

When receiving information indicating the congestion state (i.e., cause #26), a backoff timer, and the information on APN 2 included through the PDN connectivity reject message, the UE may recognize that the PDN connectivity request is rejected because since APN 2 is in the congestion state. Thus, the UE operates the backoff timer by associating it with APN 2 so that the UE may not perform an ESM procedure for APN 2 while the backoff timer is running.

According to the above-described embodiment, regardless of whether the UE knows information on the default APN or not, the backoff timer operates by being associated with the APN in the congestion state. That is, it is possible to prevent the UE from unnecessarily performing the ESM procedure for APN 2 in the congestion state.

According to the aforementioned embodiments, it is possible to prevent the following problems: UEs transmit unnecessary messages in the network congestion state; and UEs have delays in transmission due to timers even when they can perform the transmission. Meanwhile, although the embodiments have been described on the basis of EPS scenarios, the embodiments can be applied to an active packet data protocol (PDP) context request procedure of the UMTS and all related operations in a similar manner. In addition, the aforementioned embodiments can also be applied to session establishment management operations toward a specific data network in EPS-based or new mobile network systems.

3. Device Configuration

Figure 13:
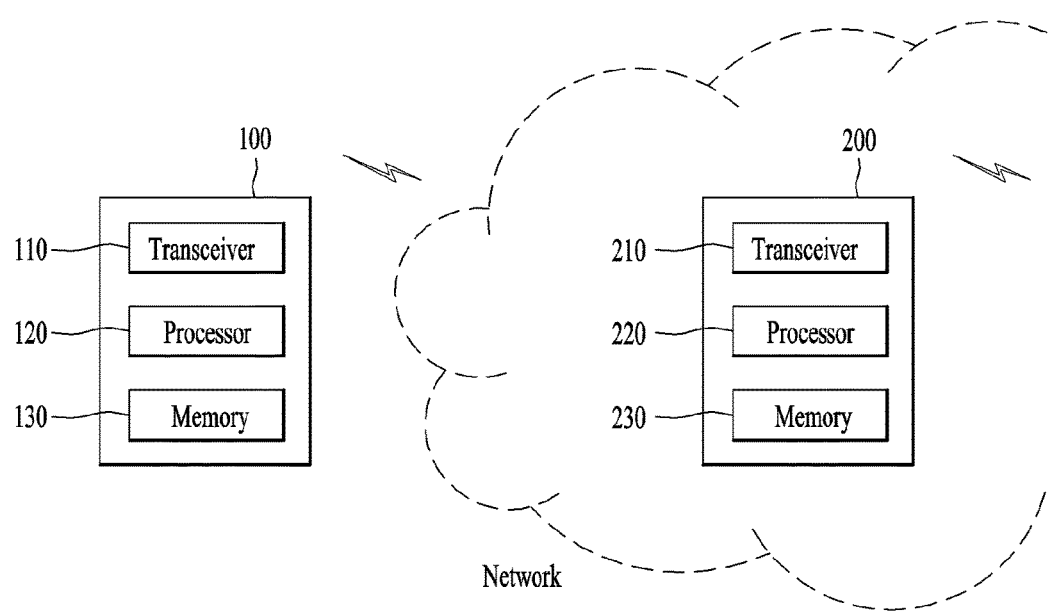
FIG. 13 is a diagram illustrating the configurations of node devices according to a proposed embodiment.

FIG. 13 is a diagram for a configuration of a node device according to a proposed embodiment.

A user equipment 100 can include a transceiver 110, a processor 120 and a memory 130. The transceiver can be configured to transmit various signals, data and information to an external device and receive various signals, data and information from an external device. The transceiver 110 can be implemented in a manner of being divided into a transmitter and a receiver. The user equipment 100 can be connected with an external device in wired and/or in wireless. The processor 120 can control overall operation of the user equipment 100 and the processor can be configured to perform a function of calculating information and the like to be transceived with an external device by the user equipment 100. And, the processor 120 can be configured to perform a UE operation proposed in the present invention. The memory 130 can store calculated information and the like for a prescribed time and can be replaced with a configuration element such as a buffer (not depicted) or the like.

Referring to FIG. 13, a network node 200 according to a proposed embodiment can include a transceiver 210, a processor 220 and a memory 230. The transceiver 210 can be configured to transmit various signals, data and information to an external device and receive various signals, data and information from an external device. The network node 200 can be connected with an external device in wired and/or in wireless. The transceiver 210 can be implemented in a manner of being divided into a transmitter and a receiver. The processor 220 can control overall operation of the network node 200 and the processor can be configured to perform a function of calculating information and the like to be transceived with an external device by the network node 200. And, the processor 220 can be configured to perform a network node operation proposed in the present invention. The memory 230 can store calculated information and the like for a prescribed time and can be replaced with a configuration element such as a buffer (not depicted) or the like.

The configurations of the user equipment and the network node as described above may be implemented such that the above-described embodiments can be independently applied or two or more thereof can be simultaneously applied, and description of redundant parts is omitted for clarity.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

INDUSTRIAL APPLICABILITY

The aforementioned method for operating a UE can be applied to not only the 3GPP system but also various wireless communication systems including an IEEE 802.16x systems and an IEEE 802.11x system. Further, the proposed method can also be applied to an mmWave communication system using super-high frequency band.

What is claimed is:

1. A method for operating a user equipment (UE), which operates in a network congestion state, in a wireless communication system, the method comprising:
    based on a determination that it is not an emergency, transmitting a packet data network (PDN) connectivity request message without information on an access point name (APN) to a network entity;
    receiving, from the network entity, a PDN connectivity reject message comprising a backoff timer,
    wherein the PDN connectivity reject message does not include the information on the APN, in response to the PDN connectivity request message; and
    based on an assumption that the backoff timer is applied to a default APN, with which the UE had established a PDN connection previously, restricting an Evolved packet service Session Management (EPS Session Management, ESM) procedure for the default APN during the backoff timer is running and performing the ESM procedure for other APNs other than the default APN regardless the backoff timer being running.

2. The method of claim 1, wherein the backoff timer is not applied to the other APNs other than the default APN.

3. The method of claim 1, wherein the ESM procedure comprises transmitting a modify bearer request message or a PDN connectivity request message with respect to a certain APN.

4. A user equipment (UE) operating in a network congestion state in a wireless communication system, the UE comprising:
    a transmitter;
    a receiver; and
    a processor connected to the transmitter and the receiver, wherein the processor is configured to:
    based on a determination that it is not an emergency, transmit a packet data network (PDN) connectivity request message without information on an access point name (APN) to a network entity;
    receive, from the network entity, a PDN connectivity reject message comprising a backoff timer,
    wherein the PDN connectivity reject message does not include the information on the APN, in response to the PDN connectivity request message; and
    based on an assumption that the backoff timer is applied to a default APN, with which the UE had established a PDN connection previously, restrict an Evolved packet service Session Management (EPS Session Management, ESM) procedure for the default APN during the backoff timer is running and perform the ESM procedure for other APNs other than the default APN regardless the backoff timer being running.

5. The UE of claim 4, wherein the backoff timer is not applied to the other APNs other than the default APN.

6. The UE of claim 4, wherein the ESM procedure comprises transmitting a modify bearer request message or a PDN connectivity request message with respect to a certain APN.

* * * * *